United States Patent
Edvardsson (10) Patent No.: US 6,759,976 B1
(45) Date of Patent: Jul. 6, 2004

(54) METHOD AND APPARATUS FOR RADAR-BASED LEVEL GAUGING

(75) Inventor: Kurt Olov Edvardsson, Täby (SE)

(73) Assignee: Saab Marine Electronics AB, Goteborg (SE)

( * ) Notice: Subject to any disclaimer, the term of this patent is extended or adjusted under 35 U.S.C. 154(b) by 0 days.

(21) Appl. No.: 10/327,426

(22) Filed: Dec. 20, 2002

(51) Int. Cl.$^7$ ............................................. G01S 13/08
(52) U.S. Cl. ...................................................... 342/124
(58) Field of Search .................... 342/118–124, 188; 324/644; 73/290 R, 290 B, 290 V, 304 R, 304 C, 305–322, 322.5

(56) References Cited

U.S. PATENT DOCUMENTS

| | | | |
|---|---|---|---|
| 4,670,753 A | | 6/1987 | Vacanti .......................... 342/90 |
| 5,420,591 A | * | 5/1995 | Annee et al. ................. 342/188 |
| 5,543,720 A | | 8/1996 | Edvardsson .................. 324/643 |
| 5,614,831 A | | 3/1997 | Edvardsson .................. 324/642 |
| 5,987,994 A | * | 11/1999 | Maltby et al. .................. 73/646 |
| 6,353,407 B1 | * | 3/2002 | Donnelly ...................... 342/124 |
| 6,539,794 B1 | * | 4/2003 | Otto et al. ................. 73/290 V |
| 6,606,904 B2 | * | 8/2003 | Muller et al. .............. 73/290 V |

FOREIGN PATENT DOCUMENTS

| | | | |
|---|---|---|---|
| DE | 32 10 400 A1 | | 1/1989 |
| EP | 592584 B1 | * | 1/1997 |
| GB | 2 265 513 | | 9/1983 |
| JP | 01065420 | | 3/1989 |
| JP | 2002243845 | | 8/2002 |
| WO | WO 93/01474 | | 1/1993 |
| WO | WO 94/18549 | | 8/1994 |

* cited by examiner

*Primary Examiner*—Thomas H. Tarcza
*Assistant Examiner*—Isam Alsomiri
(74) *Attorney, Agent, or Firm*—Westman, Champlin & Kelly, P.A.

(57) ABSTRACT

A method for radar-based gauging of the level of a substance in a tank (13) having at least one interfering structure, e.g. a beam (16a); an agitator (16b) or a tank side wall (16c), comprises transmitting a microwave signal in a predetermined polarization state (LHCP) towards the surface (14) of the substance and the at least one interfering structure; detecting, separately in two different polarization states (LHCP, RHCP), microwave signals (32, 33, 34) as reflected against the surface of the substance and against the at least one interfering structure; distinguishing based on signal strengths of the microwave signals detected separately in the two different polarization states, the detected microwave signal (32), which has been reflected against the surface of the substance; and calculating based on a propagation time of the distinguished microwave signal the level of the substance in the tank.

30 Claims, 4 Drawing Sheets

METHOD AND APPARATUS FOR RADAR-BASED LEVEL GAUGING

FIELD OF THE INVENTION

The invention relates generally to level gauging, and more specifically the invention relates to a method and an apparatus for radar-based level gauging.

BACKGROUND OF THE INVENTION AND RELATED ART

Radar-based methods are extensively used for level gauging, i.e. measuring a distance from the top of a tank to a surface of a liquid or some kind of granular solid stored in the tank, by means of transmitting microwaves towards the surface of the liquid or the granular solid, receiving the microwaves as reflected against the surface of the liquid or solid, i.e. the surface echo, and calculating the level of the liquid or solid in the tank from the propagation time of the transmitted and reflected microwaves.

One very general problem in this respect is that the tank includes typically various structures, such as beams, support beams, pipes, agitators, tank walls, etc. Such structures may also reflect microwaves, and such echoes can interfere with the microwaves reflected from the surface of the liquid or solid, the level of which being gauged. An interfering echo having a signal strength considerably lower than the signal strength of the surface echo will cause measuring errors if the structures creating the interfering echoes is close to, i.e. within a few tenths of a meter from, the surface. If the interfering echo is stronger than the echo from the surface the interfering echo may falsely be selected as the surface echo. Various echo logic methods have been applied to decrease this risk, but nevertheless this is a large problem in many tank environments.

The selection of correct microwaves is thus extremely important and any possibility of distinguishing microwave signals reflected from the surface of the liquid or solid from microwaves reflected from other structures is very useful.

Typically, prior art radar level gauges typically select the strongest echo.

The ideal case is to use an antenna with a rather narrow lobe located in the tank where no disturbing echoes are close to the antenna lobe. In this case the surface echo may be the strongest one even after some degradations due to turbulence, foam etc. For smaller tanks various tank structures may approach the antenna beam, not at least since the antenna has to be smaller. Furthermore when the echo from the surface is close to a disturbing echo there is a risk for a large measuring error.

SUMMARY OF THE INVENTION

A main object of the invention is thus to provide a method and an apparatus for radar-based level gauging, wherein detected microwaves as reflected from the surface of the liquid or solid can be distinguished from detected microwaves as reflected from other disturbing structures.

In this respect there is a particular object of the invention to provide such a method and such an apparatus, which are very useful in tanks having a large number of disturbing structures and in tanks where the radar-based level gauging equipment has to be mounted in region where disturbing structures do occur.

A further object of the present invention is to provide such a method and such an apparatus, which provide for level gauging also of highly turbulent surfaces, where the reflected microwaves are weak.

A still further object of the invention is to provide such a method and such an apparatus, which are reliable, efficient, accurate, and precise.

These objects, among others, are attained by methods and apparatuses as claimed in the appended claims.

According to a first aspect of the present invention there is provided a method for radar-based gauging of the level of a substance, e.g. a liquid or a granular solid, in a tank having one or several interfering structures, such as e.g. a beam, a support beam, an agitator, or a tank side wall. The method comprises to transmit a microwave signal in a predetermined polarization state, e.g. left hand circular polarization, towards a surface of the liquid or granular solid and the interfering structure(s). Microwave signals as reflected against the surface of the liquid or granular solid and against the interfering structure(s) are detected temporally resolved and separately in at least two different polarization states, e.g. left and right hand circular polarizations. Then, the detected microwave signal, which has been reflected against the surface of the liquid or granular solid, is distinguished based on signal strengths of the microwave signals detected temporally resolved and separately in the two different polarization states. Finally, the level of the liquid or granular solid in the tank is calculated based on a propagation time of the distinguished microwave signal.

The inventor of the present invention has noted that the detected microwave signal, which has been reflected against the surface of the liquid or granular solid, is distinguishable by means having notably different signal strength in the two different polarization states. This is true as long as the surface is calm. In contrast thereto, the detected microwave signal(s), which has been reflected against the surface of the interfering structure(s), has (have) typically similar signal strength(s) in the two different polarization states. For the microwave signal any two preferably orthogonal polarizations will cover all different possible combinations. In the signal processing, however, more than two different signals may be formed and used.

By detecting the microwave echoes in two separate polarizations a further processing can be performed not only limited to the detection and rejection of disturbing echoes, but also for enabling a decrease of the influence of disturbing echoes close to the surface echo. For each echo a linear combination of the signals in the two received polarizations can be found, where the echo is very weak, while other echoes are less or much less reduced. This enables in many cases a substantial improvement of the signal-to-disturbance ratio assuming that different linear combinations are used for different disturbing echoes. Using prior art equipment large measuring errors cannot be avoided if the disturbing echo is close to the surface echo and of comparable strength.

Further, a time variation of the signal strengths may be recorded to distinguish a microwave signal reflected against a turbulent surface from microwave signals reflected against fixed interfering structures. The time variation for the echo from a turbulent surface can in stochastic sense in most cases be described as Raleigh distributed. This can be used as one distinctive feature to separate the echo from the turbulent surface from the much more steady echo from a fixed disturbing echo. In one embodiment of the invention the polarization diversity is combined with the time variation measurement to obtain a selection criteria, which is usable, both for calm and turbulent surfaces.

Transceiver apparatuses capable of producing polarized microwave radiation and of receiving reflected microwave radiation in two different polarization states separately include preferably any of a power divider, particularly a Wilkinson power divider, a directional coupler, a ferrite circulator, or multiple antennas.

According to a second aspect of the present invention there is provided a radar-based level gauge apparatus for performing the method according to the first aspect of the invention.

By means of the present invention a very robust routine for distinguishing detected microwave signals, which have been reflected against the surface of the substance gauged, may be implemented. As compared to prior art devices the invention provides for measurement in more disturbing environments, i.e. where more interfering echoes do occur, with higher accuracy. For instance, microwave signals reflected at the surface of the substance, may be distinguished despite being weaker to much weaker than a microwave signal as reflected against an interfering structure.

The radar-based level gauges are used to measure levels in tanks, which for the purpose of the present invention include not only large containers but also processing apparatuses such as, for example, reactors, centrifuges, mixers, hoppers, graders, or heat-treatment furnaces and similar devices, which are used in e.g. food chemistry, pharmaceutical chemistry, biochemistry, gene chemistry and petrochemistry.

Further characteristics of the invention, and advantages thereof, will be evident from the detailed description of preferred embodiments of the present invention given hereinafter and the accompanying FIGS. 1–4, which are given by way of illustration only, and thus are not limitative of the present invention.

DESCRIPTION OF PREFERRED EMBODIMENTS

Figure 1A:
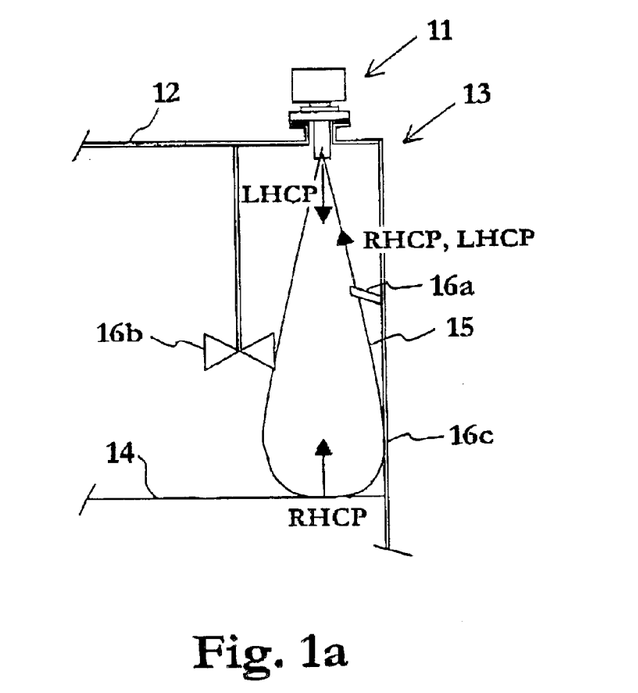
FIG. 1a illustrates schematically, in a side view, an apparatus for radar-based level gauging according to a preferred embodiment of the present invention.

With reference to FIG. 1a, which schematically illustrates, in a side view, an apparatus aimed for radar-based level gauging, a preferred embodiment of the present invention will be described. The apparatus may be a frequency modulated continuous wave (FMCW) radar apparatus, a pulsed radar apparatus, or any other type of distance measuring radar.

The radar-based level gauge, denoted by 11 in FIG. 1a, is mounted above an opening of a roof 12 of a tank 13 or container filled with a liquid or a granular solid, the level 14 of which being gauged. The tank 13, of which only portions are shown in FIG. 1a, has typically a number of structures, e.g. a support beam 16a, an agitator 16b and a tank side wall 16c, that may create disturbing microwave reflections within the tank. When a radar level gauge is to be installed a typical criteria is to find a location where the influence of such disturbances is small but the practical possibilities to attain this criteria is generally small.

During operation, the radar-based level gauge, 11 transmits a microwave signal towards the surface 14 of the liquid or granular solid in the tank 13, and receives the microwave signal as reflected against the surface, i.e. the surface echo. Further, the radar-based level gauge 11 comprises, or is connected to, a signal processing device (not explicitly illustrated) for calculating from the propagation time of the microwave signal from the radar-based level gauge 11 to the level 14 of the liquid or granular solid, and back to the radar-based level gauge 11.

The expression propagation time is used throughout this text as a general expression for a result of distance calculations. Several types of radar-based apparatuses are known for detection of echoes and distance evaluations. Different radar-based apparatuses use different methods and different intermediate results will occur. In each case, however, the radar input signal can be described as echoes of different amplitude and phase ordered after their delay time as compared to the transmitted signal.

One example is a pulsed radar-based level gauging apparatus, where a sampling technique is used for re-scaling or stretching the time by a factor 1,000–1,000,000. Another example is the FMCW radar-based level gauging apparatus, where a usually linear frequency sweep results in a spectrum where the propagation time is translated to intermediate frequency (IF). In this case the IF signal corresponds to the Fourier transform of the IF signal for the pulsed case. The very short time differences (1.5 mm distance corresponds to 0.01 ns) will in both cases be translated (downscaled) to signals with a much more handy time and frequency behavior and thus the signal processing is simplified and components having lower price, lower current consumption etc. can be used.

According to the present invention the radar-based level gauge 11 transmits a microwave signal in a particular or predetermined polarization state towards the surface 14 of the liquid or granular solid and surrounding interfering structures 16a–c; and detects temporally resolved and separately, in two different polarization states, microwave signal echoes as reflected against the surface 14 and the surrounding interfering structures 16a–c. By temporally resolved is here meant that the delay times as compared to the transmitted signal, or other parameter values depending thereon, are recorded for the echoes.

Preferably, the radar-based level gauge 11 transmits a circularly polarized microwave signal, e.g. left hand circularly polarized LHCP as illustrated in FIG. 1a or right hand circularly polarized RHCP, and detects microwave signal echoes in both left and right hand circular polarization states LRCP, RHCP. However, other polarization states are possible, such as e.g. two orthogonal linear polarization states XLP, YLP.

The present inventor has discovered that different structures in the tank environment change the polarization state of a microwave signal differently at reflection. For instance, a calm surface 14 changes the polarization state of an incident microwave. Given an incident left hand circularly polarized LHCP microwave signal, the surface echo will be essentially right hand circularly polarized RHCP, as is indicated in FIG. 1a. In contrast thereto most interfering structures will only partly change the polarization of the incident polarized microwave signal, and the echoes from the interfering structures will in general have similar signal strengths in the two different circularly polarization states LHCP, RHCP. This is indicated for the support beam 16a in FIG. 1a. Another way to express this is that a linearly polarized wave will have markedly different reflection if the polarization is parallel or if it is perpendicular to for instance a straight steel beam.

Thus, the signal processing device of the level gauge 11 is adapted to distinguish, based on the notably different signal strengths of the separately detected microwave signal echoes in the two different polarization states, the surface echo.

Depending on the type of radar-based level gauge used only the different amplitudes may be detected or both different amplitudes and different phase may be detected. Most pulsed systems utilize only the amplitude while a typical FMCW-system may use both phase and amplitude.

Finally, when the surface echo is found the level of the liquid or granular solid is calculated from the propagation time of the surface echo.

Figure 1B:
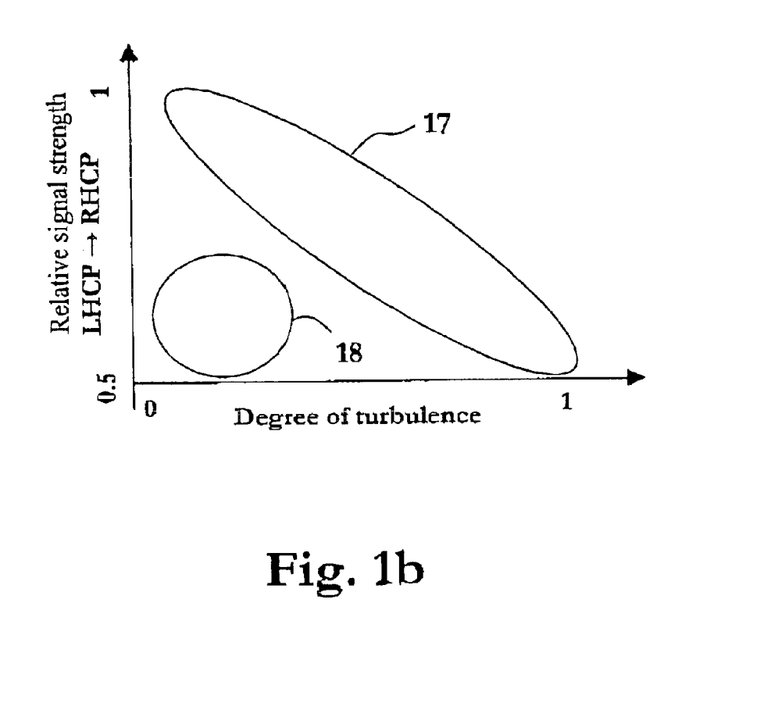
FIGS. 1b–c are diagrams illustrating various polarization properties of different kind of echoes.

The received signal can be described by a diagram where the depolarization of the received signal is shown as a function of the degree of turbulence. Degree of turbulence can be defined in different ways but is a measure on the time dependence and can be defined as the standard deviation of the amplitude divided by the average value of the amplitude. An alternative formulation is the difference between maximum amplitude and minimum amplitude divided by the average amplitude. In FIG. 1b the degree of turbulence is assumed to be near 0 for the echo from a calm surface but near 1 for the echo from a turbulent surface. Likewise, depolarization can be defined in different ways but 1 is in FIG. 1b assumed to correspond to a smooth surface, where the transmitted LHCP signal is received as an entirely RHCP signal (or RHCP to LHCP), while 0.5 implies that half the received power is received as LHCP and the other half as RHCP (which is the case for a turbulent surface). A typical property of a circularly polarized wave (LHCP or RHCP) is that the direction of polarization is reversed by the reflection (LHCP to RHCP etc.).

When the surface is turbulent the surface echo does not change polarization state completely as can be seen in FIG. 1b, wherein the relative signal strength of right hand circularly polarized RHCP microwaves as a function of relative degree of turbulence when left hand circularly polarized LHCP microwaves are transmitted from the gauge is shown. A surface echo area is indicated by 17, where echoes from a calm surface are found in the upper portion of the area 17, i.e. a high relative RHCP signal strength and low relative degree of turbulence, whereas echoes from a highly turbulent surface are found in the lower portion of the area 17, i.e. a relative RHCP signal strength closer to 0.5 and high relative degree of turbulence. An area for typical echoes from disturbing structures in the tank is indicated by 18, i.e. echoes having a relative RHCP signal strength closer to 0.5 and low relative degree of turbulence. Thus, by means of repeating the transmission and detection a time variation of the signal strengths of the various echoes may be measured. Then, turbulent surface echoes may be distinguished from echoes from fixed structures by means of searching for detected echoes with a noticeable time variation. Thus, neither the time dependence nor the polarization alone can distinguish fixed echoes from surface echoes, but when combined in a suitable way a much more efficient tool for distinguishing is obtained.

In some environments the selection procedures as discussed above may not be sufficient for selecting the correct surface echo by high certainty. In such circumstances a signal in two different, preferably orthogonal, linearly polarized polarization states XLP, YLP can be formed from the microwave signal detected in the two circular polarization states, and the selection procedure for selection of the correct surface echo can be based also on the signal in the two different linearly polarized polarization states as formed.

Figure 1C:
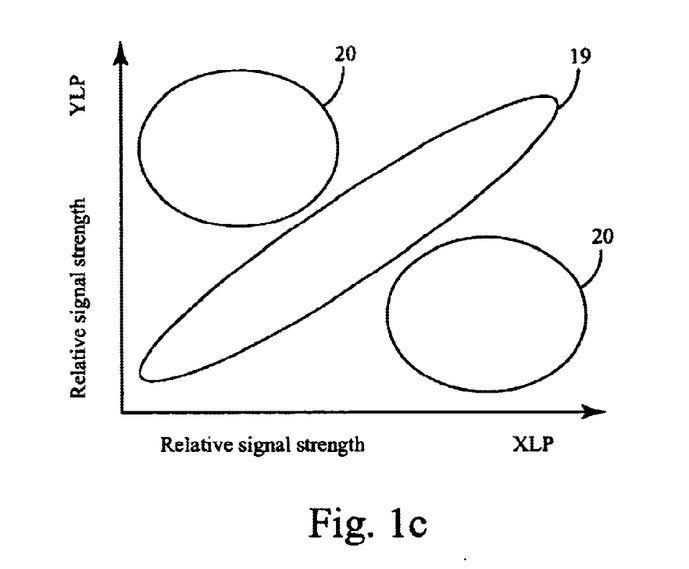

Surface echoes from at least calm surfaces will be of similar strengths for two different orthogonal linear polarization XLP, YLP states, whereas interfering echoes will have noticeably different signal strengths in the two different linear polarizations. This is illustrated in FIG. 1c, which shows the relative signal strength of vertically linearly polarized YLP microwaves as a function of the relative signal strength of horizontally linearly polarized XLP microwaves. Most surface echoes are found within an area denoted 19, whereas most interfering echoes are found within any of the areas denoted by 20.

Thus, classification of the echo in order to simplify the selection of the correct surface echo can be performed but this can be seen as just a first step. The extraction of two signal channels received in two polarizations enables the forming of an arbitrary linear combination of the signals and by a suitable choice of such a linear combination it is generally possible to improve the signal-to-disturbance ratio. By means of the echo selection procedure according to the present invention, surface echoes having signal strengths, which are much lower than signal strengths of interfering echoes, are detectable and distinguishable.

Besides the signal strength the phase of the radar signal is important. The amplitude and phase of a signal is called the complex amplitude. Depending on details in the radar-based level gauging apparatus the amplitude only or both amplitude and phase are measured.

Next, with reference to FIGS. 2a–f various implementations of the antenna structure used for sending and receiving the microwaves in an apparatus of the present invention. Note that while only a few examples are explicitly given below, the present invention is not limited to those, but can be implemented by any structure capable of sending microwaves in a particular polarization state and receiving microwaves in two different polarization states separately. However, radar level gauges are low cost items as compared to most other radar equipment, and thus the antenna structure used is preferably simple and of low cost compared.

In a typical embodiment the radar transmitter is connected to a circularly polarized antenna, while the receiver (subsequently named the main receiving channel) is connected to a circularly polarized antenna with the opposite direction. By this difference in polarization the two antenna functions can be included in one physical antenna yet without (ideally seen) coupling between them. By this the use of circular polarization a transmit/receive switch is avoided in the case of a rotationally symmetric target. The second receiver channel (subsequently named auxiliary receiving channel) is connected via a directional coupler and receives a reflected signal having the same polarization as the transmitted signal. Both receiving channels include a mixer and IF (intermediate frequency) amplifier but depending on the type of radar different to (local oscillator) signal can be used. A typical FMCW system for this use have homodyne mixing with a part of the transmitter signal with suitable delay as LO signal while a typical pulsed signal use a separate pulsed oscillator which in this case should be the same for both receiving channels.

Figure 2A:
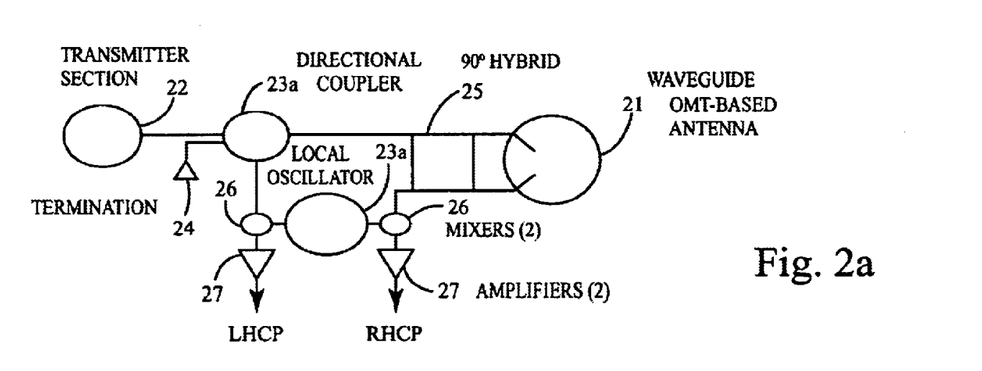
FIGS. 2a–f illustrate schematically, in side views, various implementations of a transceiver structure used in radar-based level gauging apparatuses of the present invention.

In FIG. 2a is shown a transceiver structure including a waveguide OMT (orthomode transducer) based antenna 21 connected to a transmitter section 22 via a directional coupler 23 having a termination 24. Two receiver channels RHCP and LHCP are connected to the antenna via the directional coupler 23a and via a 90° hybrid 25. The microwave signals formed as described are fed to two mixers 26 followed by two amplifiers 27 for the intermediate frequency (IF). Reference numeral 28 indicates the local oscillator. The exact implementation may different depending on the type of radar (FMCW, pulse) and in some cases low noise amplifiers will be necessary on the microwave side to get sufficient sensitivity. Such implemental details are, however, easily contemplated by the man skilled in the art after having read the present text.

Figure 2B:
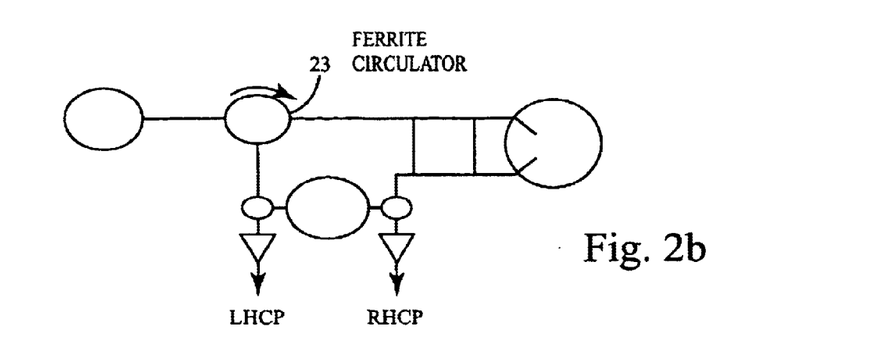

In FIG. 2a the directional coupler 23 acts as the transmit/receive connection device, which functionally is a part of most radar systems and especially those where the sane antenna is used for the transmitter and the receiver. The transmit/receive device can be of different kinds. In FIG. 2b is shown a solution with a ferrite circulator 23b being used instead of the directional coupler (23a in FIG. 2a). The ferrite circulator 23b has three connections and directs the signal entered in one output to the next output in a given order. The ferrite circulator 23b is more complex than directional coupler but saves some decibel in the radar transmission power budget.

Figure 2C:
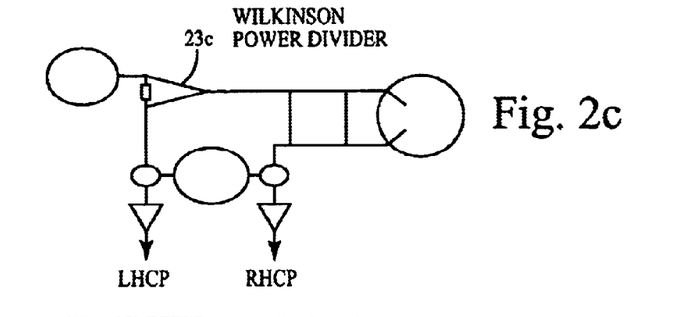

FIG. 2c shows another solution where a Wilkinson power divider 23c is used instead of the directional coupler and still maintaining the insulation between transmit and receive sections—in this case with 2×3 dB further loss as compared to the ideal circulator.

Figure 2D:
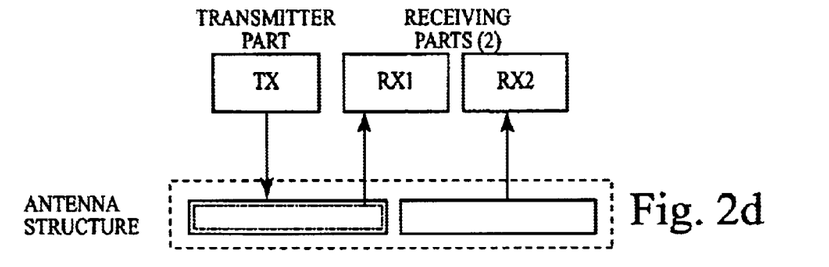

In FIG. 2d is shown a more general antenna structure with one transmitter part TX and two receiving parts RX1, RX2, each using essentially orthogonal polarizations and having a fair insulation to the transmitting antenna. For instance many planar antennas designs with dual polarization over the same surface are well known and widely used (not the least in the field of mobile phone base station antennas).

For a pulsed system also a switch can be used for the transmit/receive device.

Figure 2E:
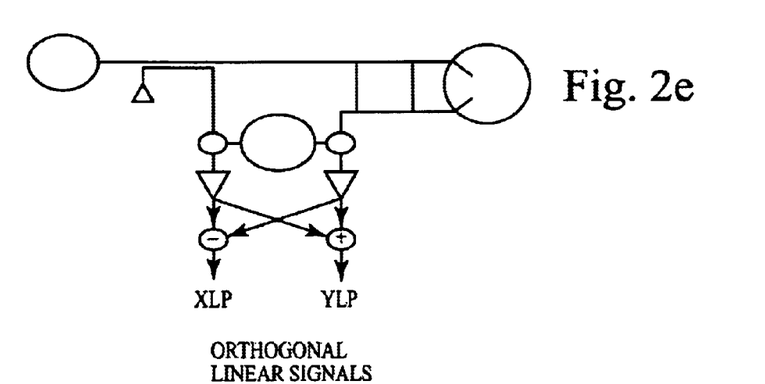

In FIG. 2e is illustrated how to obtain two orthogonal linear signals XLP and YLP from the two orthogonal circular polarized signals as obtained by the device illustrated in FIG. 2a.

The echo selection routine is implemented in the signal processing included in, or associated with, the radar-based level gauge 11.

The routine may include generating, separately for each polarization state, the amplitude of the received reflected microwave signal as a function of propagation time up to reception. Noticeably, a calm surface of the liquid or granular solid gauged will give echoes of noticeably different amplitude in each polarization state, whereas many disturbing obstacles in the tank will give echoes of similar amplitudes in the different polarization states. Ideally, if a left hand circularly polarized microwave signal is reflected towards a calm surface its polarization state changes to right-hand circular polarization at reflection.

Figure 2F:
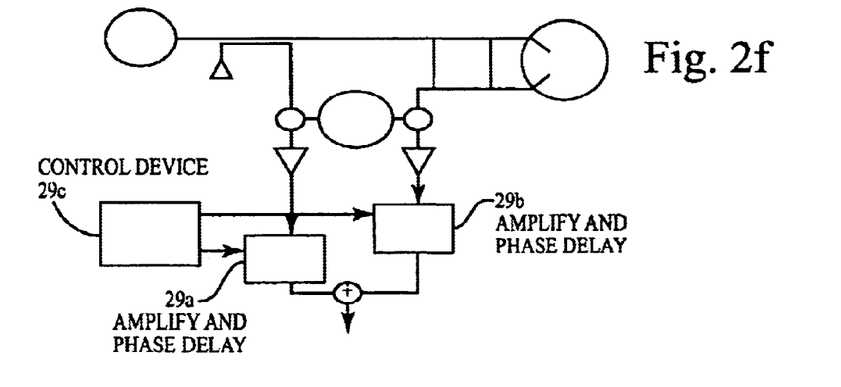

Two potential problems with disturbing echoes are incorrect echo selection (where a disturbing echo, perhaps stronger than the surface echo, is taken for the surface echo) and interference errors, where the disturbing echoes cause measuring echoes (even if they are substantially weaker than the surface echo). Errors typically occur only when the surface echo is close to the disturbing echo (a few tenths of a meter). The type of receiver and procedures discussed above will decrease considerable the risk of incorrect echo selection, whereas a reduction of the interference errors needs other means. Still the two receiver channels can be used and using a signal processing as shown in FIG. 2f the disturbing echo can be suppressed considerably, which improves the signal-to-disturbance ratio. The type of radar device has be a device, such as for instance a commonly used FMCW radar-based level gauge, which measures both phase and amplitude. Phase and amplitude for the main receiver channel and the auxiliary receiver channel (as obtained e.g. by the device of FIG. 2a) can be altered individually by means of a respective device for amplifying and phase delaying 29a–b under control of a control device 29c. Then, the two channels are mixed whereby the disturbing echo can be more or less cancelled. The factors used to obtain the cancellation are different for different disturbing echoes but they are approximately the same in a vicinity of a specific disturbing echo.

Figure 3:
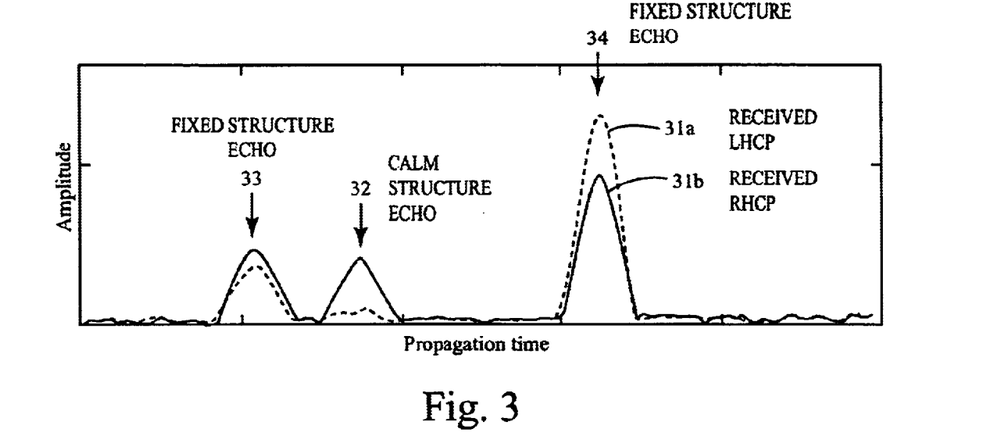
FIG. 3 shows schematically a diagram of the amplitude of the received reflected microwave signal as a function of propagation time for two different polarization states as obtained by the apparatus of FIG. 1 indicating microwave signals as reflected from the surface of the matter gauged and from a fixed structure in the tank.

FIG. 3 shows schematically an example of a diagram of the amplitude of the received reflected microwave signals as a function of propagation time for two orthogonal circular polarizations, e.g. as illustrated in FIG. 1a. Left hand circularly polarized transmitted microwaves are assumed. The dotted curve 31a indicates received signal with left hand circular polarization, and the solid curve 31b indicates received signal with right hand circular polarization.

Three microwave signal echoes 32, 33, 34 are clearly visible. By analyzing the amplitudes of the echoes it is established that the echo 32 is reflected from a calm surface of the liquid or granular solid gauged, whereas the echoes 33, 34 are reflected from a fixed structure in the tank, e.g. a beam, an agitator, or a tank side wall. With a suitable logic, selection of the correct surface echo can be made even if the surface echo is not the strongest one.

Figure 4:
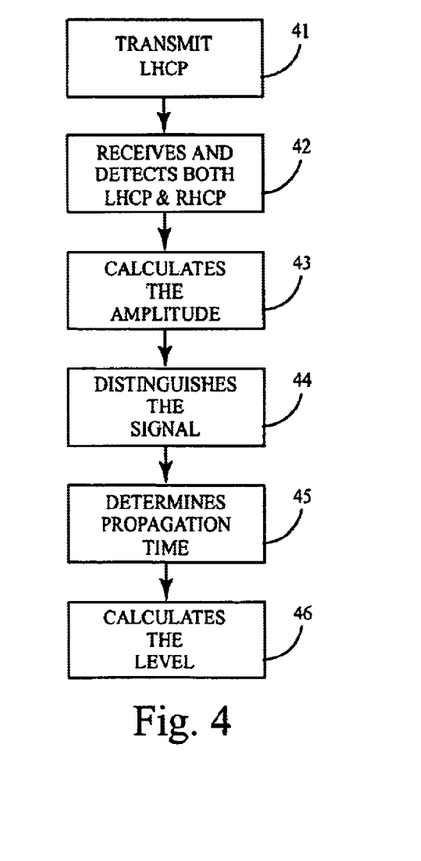
FIG. 4 is a schematic flow diagram illustrating a method for radar-based level gauging according to a preferred embodiment of the present invention.

Thus, a method for radar-based gauging of the level of a substance in a tank can be described with reference to the schematic flow scheme shown in FIG. 4. A left hand circularly polarized microwave signal is, in a step 41, transmitted. The microwave signal as reflected towards the surface of the substance gauged and towards any disturbing structures, is, in a step 42, received and detected separately in left and right hand circular polarization states. Then, for each of the two polarization states, the amplitude of the detected reflected microwave signal as a function of propagation time is, in a step 43, calculated. By comparison of the two functions as being illustrated in FIG. 3 the microwave signal 32 as reflected against the surface is, in a step 44, distinguished. Finally, in steps 45 and 46, the propagation time for the microwave signal 32 as reflected against the surface is determined and the level of the substance is calculated from the propagation time.

It shall be appreciated that the amplitude of the received reflected microwave signals as a function of propagation time for a number of distance cells, i.e. level intervals of the surface of the gauged matter, and for each different polarization state may be stored in a database. Then knowledge of the localization of disturbing structures and interfering echoes in a particular tank may be collected with time. Once having a database it may be consulted when a gauged level has been calculated.

It shall further be appreciated that any of the methods or method steps identified above may be combined with the use of lobe diversity to obtain even better capabilities of distinguishing the surface echo under various conditions. In this respect reference is made to our co-pending European patent application entitled "Method and apparatus for radar-based level gauging" (inventor: Kurt-Olov Edvardsson) and filed the very same date as the present application.

It shall still further be appreciated that the inventive concept of having one polarized transmit channel and two differently polarized receive channels is fully reciprocal in the sense that the present invention may be realized by using two differently polarized transmit channels and one polarized receive channel.

To implement such concept the transmit channels have to operate one after the other in order to detect individually the received echo signal from each transmitted channel.

A method for radar-based gauging of the level of a substance in a tank having at least one interfering structure thus comprises the steps of (i) transmitting microwave signals in two different predetermined polarization states, one after the other, towards a surface (14) of the substance and the at least one interfering structure; individually for each of the transmitted microwave signals detecting temporally resolved in a predetermined polarization state, microwave signals (32, 33) as reflected against the surface of the substance and as reflected against the at least one interfering structure; distinguishing, based on signal strengths of the microwave signals detected temporally resolved, the detected microwave signal (32), which has been reflected against the surface of the substance; and calculating based on a propagation time of the distinguished microwave signal the level of the substance in the tank.

If the two polarization states of the transmitted signals are left and right hand circularly polarized the receive channel is typically arranged to receive and detect either one of left or right hand circularly polarized microwaves.

A surface echo will thus have very different signal strengths for the two transmit polarizations, whereas a depolarizing disturbing structure will give echoes with similar signal strengths for the two transmit polarizations.

What is claimed is:

1. A method for radar-based gauging of the level of a substance in a tank having at least one interfering structure, comprising the steps of:
    transmitting a microwave signal in a predetermined polarization state towards a surface of said substance and said at least one interfering structure;
    detecting temporally resolved and separately in two different polarization states, microwave signals as reflected against the surface of said substance and as reflected against said at least one interfering structure;
    distinguishing, based on signal strengths of the microwave signals detected temporally resolved and separately in said two different polarization states, the detected microwave signal, which has been reflected against the surface of said substance; and
    calculating based on a propagation time of the distinguished microwave signal the level of said substance in said tank.

2. The method of claim 1 wherein said predetermined polarization state is a circularly polarized polarization state.

3. The method of claim 2 wherein said two different polarization states are two essentially orthogonal circularly polarized polarization states.

4. The method of claim 3 wherein the detected microwave signal, which has been reflected against the surface of said substance, is distinguished by means having notably different signal strength in said two different polarization states.

5. The method of claim 3 wherein
    a signal in two different linearly polarized polarization states is formed from the microwave signal in said two essentially orthogonal circularly polarized polarization states; and
    said step of distinguishing is based also on said signal in two different linearly polarized polarization states.

6. The method of claim 5 wherein the detected microwave signal, which has been reflected against the surface of said substance, is distinguished by means having similar signal strength in said two different linearly polarized polarization states.

7. The method of claim 1 wherein said predetermined polarization state is a linearly polarized polarization state; and said two different polarization states are two essentially orthogonal linearly polarized polarization states.

8. The method of claim 1 wherein
    a signal strength as a function of propagation time for each reflected microwave signal in each of said two different polarization states is obtained in said step of detecting; and
    the detected microwave signal, which has been reflected against the surface of said substance, is distinguished by means of comparing said functions.

9. The method of claim 8 wherein said signal strength as a function of propagation time for each reflected microwave signal in each of said two different polarization states obtained in said step of detecting is stored in a database.

10. The method of claim 1 wherein
    said steps of transmitting and detecting are repeated; and
    said step of distinguishing is based also on the variation in signal strengths of the detected microwave signals.

11. The method of claim 1 wherein said substance is a liquid.

12. The method of claim 1 wherein said substance is a granular solid.

13. The method of claim 1 wherein said at least one interfering structure is any of a beam; an agitator or a tank side wall.

14. The method of claim 1 wherein said step of detecting is performed by a device including any of a power divider, particularly a Wilkinson power divider, a directional coupler, a ferrite circulator, or multiple antennas.

15. The method of claim 1 wherein the phase of each of said detected microwave signals is measured.

16. The method of claim 1 wherein said temporally resolved and separately in two different polarization states detected microwave signals are mixed to form microwave signals, of which the microwave signal as reflected against said at least one interfering structure is suppressed.

17. The method of claim 16 wherein said temporally resolved and separately in two different polarization states detected microwave signals are mixed to form said microwave signals after having had their respective amplitudes altered.

18. The method of claim 17 wherein said temporally resolved and separately in two different polarization states detected microwave signals are mixed to form said microwave signals after having had their respective phases altered.

19. An apparatus for radar-based gauging of the level of a substance in a tank having at least one interfering structure, comprising:
    a transmitter for transmitting a microwave signal in a predetermined polarization state towards a surface of said substance and said at least one interfering structure;

a detector for detecting temporally resolved, separately in two different polarization states, microwave signals as reflected against the surface of said substance and as reflected against said at least one interfering structure; and a processing device for distinguishing based on signal strengths of the microwave signals detected temporally resolved and separately in said two different polarization states, the detected microwave signal, which has been reflected against the surface of said substance; and for calculating, based on a propagation time of the distinguished microwave signal, the level of said substance in said tank.

20. The apparatus of claim 19 wherein said predetermined polarization state is a circularly polarized polarization state.

21. The apparatus of claim 20 wherein said two different polarization states are two essentially orthogonal circularly polarized polarization states.

22. The apparatus of claim 21 wherein said processing device is adapted to distinguish the detected microwave signal, which has been reflected against the surface of said substance, by means having notably different signal strength in said two different polarization states.

23. The apparatus of claim 21 wherein said processing device is adapted to form a signal in two different linearly polarized polarization states from the microwave signal in said two essentially orthogonal circularly polarized polarization states; and to base the distinguishing also on said signal in two different linearly polarized polarization states.

24. The apparatus of claim 19 wherein said processing device is adapted to form a signal strength as a function of propagation time for each detected reflected microwave signal in each of said two different polarization states; and to distinguish the detected microwave signal, which has been reflected against the surface of said substance, by means of comparing said functions.

25. The apparatus of claim 19 wherein
said transmitter and said detector is adapted to repeatedly transmit and detect, respectively, and
said processing device is adapted to base the distinguishing also on the variation in signal strengths of the detected microwave signals.

26. The apparatus of claim 19 wherein said substance is a liquid.

27. The apparatus of claim 19 wherein said substance is a granular solid.

28. The apparatus of claim 19 wherein said at least one interfering structure is any of a beam; an agitator or a tank side wall.

29. The apparatus of claim 19 wherein said step of detecting is performed by a device including any of a power divider, particularly a Wilkinson power divider, a directional coupler, a ferrite circulator, or multiple antennas.

30. A method for radar-based gauging of the level of a substance in a tank having at least one interfering structure comprising the steps of:

transmitting microwave signals in two different predetermined polarization states, one after the other, towards a surface of said substance and said at least one interfering structure;

individually for each of the transmitted microwave signals detecting temporally resolved in a predetermined polarization state, microwave signals as reflected against the surface of said substance and as reflected against said at least one interfering structure;

distinguishing, based on signal strengths of the microwave signals detected temporally resolved, the detected microwave signal, which has been reflected against the surface of said substance; and calculating based on a propagation time of the distinguished microwave signal the level of said substance in said tank.

* * * * *